United States Patent
Allyn (10) Patent No.: US 10,216,750 B2
(45) Date of Patent: Feb. 26, 2019

(54) ANNOTATED GEOMETRY

(71) Applicant: Microsoft Technology Licensing, LLC., Redmond, WA (US)

(72) Inventor: Barry Christopher Allyn, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/683,110

(22) Filed: Apr. 9, 2015

(65) Prior Publication Data
US 2016/0104318 A1    Apr. 14, 2016

Related U.S. Application Data

(60) Provisional application No. 62/063,741, filed on Oct. 14, 2014.

(51) Int. Cl.
*G06F 17/00* (2006.01)
*G06T 11/00* (2006.01)
(Continued)

(52) U.S. Cl.
CPC .......... *G06F 17/3012* (2013.01); *G06K 9/52* (2013.01); *G06T 1/20* (2013.01); *G06T 11/003* (2013.01); *G06T 11/206* (2013.01); *G06T 11/40* (2013.01); *G06T 11/60* (2013.01); *G06T 13/20* (2013.01); *G06T 13/80* (2013.01); *G06T 15/08* (2013.01); *G06T 15/40* (2013.01); *G06T 17/10* (2013.01); *G06T 19/20* (2013.01); *G06T 2200/04* (2013.01); *G06T 2200/28* (2013.01);
(Continued)

(58) Field of Classification Search
CPC .................................................. G06F 17/3012

USPC ........................................................ 345/419
See application file for complete search history.

(56) References Cited

U.S. PATENT DOCUMENTS 5,870,101 A    2/1999  Murata et al.
6,213,944 B1   4/2001  Miller
(Continued)

FOREIGN PATENT DOCUMENTS

EP    2592598 A2    5/2013

OTHER PUBLICATIONS

U.S. Appl. No. 14/683,056, Office action dated May 17, 2016, 42 pages.
(Continued)

*Primary Examiner* — Hai Tao Sun (57) ABSTRACT

Systems and methods for associating geometry with contextual information are provided. Contextual information includes metadata about the geometry used to represent data in a visualization to improve the functioning of a device providing the visualization. Improved functioning of the device providing the visualization includes providing new features, and more efficient use of device resources for executing legacy features. Annotations may be made via escapes present in the definition of the geometry to be rendered, which are operable to bind portions of the geometry to the represented data. According to aspects, binding data to geometry improves how the visualization is rendered and improves how portions of the geometry are called out for formatting or interactivity. According to aspects, escapes may be ignored, such that their presence does not affect how the geometry is rendered.

20 Claims, 7 Drawing Sheets

(51) Int. Cl.

| | | |
|---|---|---|
| *G06F 17/30* | (2006.01) | |
| *G06K 9/52* | (2006.01) | |
| *G06T 11/20* | (2006.01) | |
| *G06T 1/20* | (2006.01) | |
| *G06T 11/60* | (2006.01) | |
| *G06T 13/20* | (2011.01) | |
| *G06T 15/08* | (2011.01) | |
| *G06T 17/10* | (2006.01) | |
| *G06T 11/40* | (2006.01) | |
| *G06T 13/80* | (2011.01) | |
| *G06T 15/40* | (2011.01) | |
| *G06T 19/20* | (2011.01) | |

(52) U.S. Cl.
CPC ...... *G06T 2210/36* (2013.01); *G06T 2210/44* (2013.01); *G06T 2219/004* (2013.01); *G06T 2219/2012* (2013.01); *G06T 2219/2024* (2013.01)

(56) References Cited

U.S. PATENT DOCUMENTS

| | | | |
|---|---|---|---|
| 6,359,629 | B1 | 3/2002 | Hopcroft et al. |
| 6,480,205 | B1 | 11/2002 | Greene et al. |
| 6,636,215 | B1 | 10/2003 | Greene |
| 6,995,768 | B2 | 2/2006 | Jou et al. |
| 7,023,440 | B1 | 4/2006 | Havekost et al. |
| 7,334,197 | B2 | 2/2008 | Robertson et al. |
| 8,090,776 | B2 | 1/2012 | Torres et al. |
| 8,527,458 | B2 | 9/2013 | Park et al. |
| 8,589,425 | B2 | 11/2013 | Gonzalez et al. |
| 8,638,343 | B2 | 1/2014 | Allyn et al. |
| 8,990,258 | B2 | 3/2015 | Bhatia |
| 9,250,926 | B2 | 2/2016 | Allyn et al. |
| 2004/0030758 | A1 | 2/2004 | Cherdron et al. |
| 2004/0068491 | A1 | 4/2004 | Iline et al. |
| 2004/0252136 | A1* | 12/2004 | Bhatt ............... G06F 17/30554 345/619 |
| 2005/0140694 | A1 | 6/2005 | Subramanian |
| 2007/0153004 | A1 | 7/2007 | Airey |
| 2007/0153006 | A1 | 7/2007 | Robbins et al. |
| 2007/0185904 | A1 | 8/2007 | Matsuzawa et al. |
| 2008/0034292 | A1 | 2/2008 | Brunner |
| 2008/0192056 | A1 | 8/2008 | Robertson et al. |
| 2009/0125809 | A1 | 5/2009 | Trapani et al. |
| 2009/0140978 | A1 | 6/2009 | Louch |
| 2009/0217163 | A1 | 8/2009 | Jaroker |
| 2009/0327921 | A1 | 12/2009 | Holm-Peterson et al. |
| 2010/0120358 | A1 | 5/2010 | Wan |
| 2010/0162152 | A1* | 6/2010 | Allyn ................... G06T 11/206 715/767 |
| 2010/0214299 | A1 | 8/2010 | Robertson |
| 2010/0277507 | A1 | 11/2010 | Allyn et al. |
| 2010/0312803 | A1 | 12/2010 | Gong et al. |
| 2011/0285727 | A1 | 11/2011 | Fernandez |
| 2012/0023077 | A1 | 1/2012 | Kann et al. |
| 2012/0124159 | A1 | 5/2012 | Takahashi |
| 2012/0218254 | A1 | 8/2012 | Abeln |
| 2012/0229445 | A1 | 9/2012 | Jenkins |
| 2012/0313957 | A1 | 12/2012 | Fisher et al. |
| 2013/0120358 | A1 | 5/2013 | Fan et al. |
| 2013/0179791 | A1 | 7/2013 | Polski et al. |
| 2013/0204841 | A1 | 8/2013 | Obusek |
| 2013/0215043 | A1 | 8/2013 | Olomskiy |
| 2013/0271472 | A1 | 10/2013 | Duran |
| 2013/0346899 | A1 | 12/2013 | Cole et al. |
| 2014/0043325 | A1* | 2/2014 | Ruble ..................... G06T 15/10 345/419 |
| 2014/0108449 | A1 | 4/2014 | Peloski |
| 2014/0125672 | A1 | 5/2014 | Winternitz et al. |
| 2014/0149669 | A1 | 5/2014 | Kim et al. |
| 2014/0298170 | A1 | 10/2014 | Mercille |
| 2014/0337703 | A1 | 11/2014 | Gong et al. |
| 2015/0346972 | A1 | 12/2015 | Boekling et al. |
| 2016/0004544 | A1 | 1/2016 | Paraschivescu |
| 2016/0103828 | A1 | 4/2016 | Woolf |
| 2016/0103872 | A1 | 4/2016 | Prophete et al. |
| 2016/0104306 | A1 | 4/2016 | Allyn |
| 2016/0104307 | A1 | 4/2016 | Allyn |
| 2016/0104308 | A1 | 4/2016 | Allyn |
| 2016/0104311 | A1 | 4/2016 | Allyn |

OTHER PUBLICATIONS

U.S. Appl. No. 14/683,091, Office action dated Apr. 20, 2016, 50 pages.
U.S. Appl. No. 14/683,079, Office action dated Apr. 20, 2016, 47 pages.
Fabian Nunez. "An extended spreadsheet paradigm for data visualization systems, and its implementation", Master's thesis, University of Cape Town, Nov. 2000. At http://citeseer.ist.psu.edu/543469.html.
Stolte, et al., "Polaris: A System for Query, Analysis, and Visualization of Multidimensional Relational Databases", In Proceedings of IEEE Transactions on Visualization and Computer Graphics, vol. 8, No. 1, Jan. 2002, 14 pages.
Petricek, et al., "Tutorial: Creating Charts with Real-Time Data", Published on: Jan. 2010 Available at: http://msdn.microsoft.com/en-us/library/vstudio/hh297119%28v=vs.100%29.aspx.
Kumar, Ajit, "Sencha Ext JS 5 Charts Architecture", Retrieved from <<http://webcache.googleusercontent.com/search?q=cache:_qqLqRn-KJEJ:blogs.walkingtree.in/2014/08/30/sencha-ext-js-5-charts-architecture/+&cd=1&hl=en&ct=clnk&gl=nl>>, Aug. 30, 2014, 7 Pages.
"International Search Report & Written Opinion Issued in PCT Application No. PCT/U52015/054110", dated Jan. 27, 2016, 13 Pages.
"International Search Report Issued in PCT Application No. PCT/US2015/055416", dated Feb. 4, 2016, 12 Pages.
"International Search Report and Written Opinion Issued in PCT Application No. PCT/US2015/055417", dated Feb. 19, 2016, 11 Pages.
Nunez, et al., "Vissh: A Data Visualisation Spreadsheet", In Proceedings of the Joint Eurographics and IEEE TCVG Symposium on Visualization, Data Visualization, Retrieved on: May 29, 2000, 10 Pages.
Kumar, Ajit, "Sencha Ext JS 5 Charts Architecture", Retrieved from <<http://webcache.googleusercontent.com/search?q=cache:_qqLqRn-KJEJ:blogs.walkingtree.in/2014/08/30/sencha-ext-js-5-charts-architecture/+&cd=1&hl=en&ct=clnk&gl=nl>>, Aug. 30, 2014, 4 Pages.
Arora, Ankush, "Google ChartsTool for Visualization Week 7 Report", Retrieved from <<http://docplayer.net/8390711-Google-charts-tool-for-visualization-week-7-reportankush-arora.html>>, Jun. 28, 2014, 25 Pages.
International Search Report and Written Opinion Issued in PCT Application No. PCT/US2015/055415, dated Feb. 15, 2016, 13 Pages.
Eskroch, "Point Culling #6", Retrieved at<<https://github.com/core-plot/core-plot/issues/6>>, Dec. 29, 2013, pp. 1-2.
Shen, et al., "On Point Feature Automatic Annotation Placement in 3D Environment", Retrieved at <<http://www.isprs.org/proceedings/XXXVII/congress/2_pdf/9_ThS-4/05.pdf>>, Jan. 1, 2008, 4 Pages.
U.S. Appl. No. 14/683,056, Office Action dated Oct. 12, 2016, 26 pages.
U.S. Appl. No. 14/683,110, Amendment and Response filed Oct. 13, 2016, 10 pages.
PCT 2nd Written Opinion in International Application PCT/US2015/055416, dated Aug. 19, 2016, 7 pages.
U.S. Appl. No. 14/683,091, Amendment and Response filed Dec. 6, 2016, 11 pages.
U.S. Appl. No. 14/683,110, Office Action dated Nov. 16, 2016, 30 pages.
U.S. Appl. No. 14/683,079, Amendment and Response filed Dec. 13, 2016, 10 pages.
U.S. Appl. No. 14/683,091, Office Action dated Jan. 5, 2017, 87 pages.

(56) References Cited

OTHER PUBLICATIONS

U.S. Appl. No. 14/683,079, Office Action dated Dec. 29, 2016, 69 pages.
U.S. Appl. No. 14/683,056, Amendment and Response filed Jan. 12, 2017, 11 pages.
U.S. Appl. No. 14/683,056, Office Action dated Jan. 23, 2017, 38 pages.
U.S. Appl. No. 14/683,100, Amendment and Response filed Jan. 19, 2017, 15 pages.
U.S. Appl. No. 14/683,100 Office Action dated Mar. 6, 2017, 42 pages.
European Office Action in Application 13728050.9, dated May 26, 2017, 3 pages.
U.S. Appl. No. 14/683,056, Office Action dated Jul. 12, 2017, 50 pages.
U.S. Appl. No. 14/683,085, Office Action dated Jul. 19, 2017, 21 pages.
U.S. Appl. No. 14/683,091, Office Action dated Aug. 7, 2017, 93 pages.
U.S. Appl. No. 14/683,100, Amendment and Response filed Aug. 1, 2017, 14 pages.
U.S. Appl. No. 14/683,079, Amendment and Response filed Apr. 28, 2017, 10 pages.
U.S. Appl. No. 14/683,079, Office Action dated May 17, 2017, 71 pages.
U.S. Appl. No. 14/683,056, Amendment and Response filed Jun. 23, 2017, 9 pages.
U.S. Appl. No. 14/683,091, Amendment and Response filed Jul. 5, 2017, 15 pgs.
U.S. Appl. No. 14/683,056, Amendment and Response filed Jan. 12, 2018, 11 pages.
U.S. Appl. No. 14/683,085, Amendment and Response filed Jan. 17, 2018, 19 pages.
U.S. Appl. No. 14/683,100, Office Action dated Nov. 27, 2017, 48 pages.
U.S. Appl. No. 14/683,085, Notice of Allowance dated Jan. 31, 2018, 15 pages.
U.S. Appl. No. 14/683,056, filed Apr. 9, 2015 entitled "Data Visualization Architecture".
U.S. Appl. No. 14/683,085, filed Apr. 9, 2015 entitled "Modular Updating of Visualizations".
U.S. Appl. No. 14/683,091, filed Apr. 9, 2015 entitled "Performance Optimization for Data Visualization".
U.S. Appl. No. 14/683,100, filed Apr. 9, 2015 entitled "Animation Framework".
U.S. Appl. No. 14/683,079, filed Apr. 9, 2015 entitled "Data Visualization Extensibility Architecture".
"Final Office Action issued in U.S. Appl. No. 14/683,100", dated May 24, 2018, 51 Pages.
"International Preliminary Report on Patentability Issued in PCT Application No. PCT/US2015/055415", dated Jan. 27, 2017, 8 Pages.
"International Preliminary Report on Patentability Issued in PCT Application No. PCT/US2015/055416", dated Jan. 27, 2017, 8 Pages.
"International Preliminary Report on Patentability Issued in PCT Application No. PCT/US2015/055417", dated Jan. 25, 2017, 10 Pages.
U.S. Appl. No. 14/683,100, Office Action dated Jul. 20, 2016, 27 pages.
U.S. Appl. No. 14/683,056, Amendment and Response filed Sep. 19, 2016, 12 pages.
U.S. Appl. No. 14/683,091, Amendment and Response filed Aug. 22, 2016, 11 pgs.
U.S. Appl. No. 14/683,091, Office action dated Sep. 8, 2016, 43 pages.
PCT 2nd Written Opinion in International Application PCT/US2015/055415, dated Aug. 19, 2016, 7 pgs.
U.S. Appl. No. 14/683,079, Amendment and Response filed Aug. 22, 2016, 11 pages.
U.S. Appl. No. 14/683,079, Office action dated Sep. 13, 2016, 71 pages.
PCT 2nd Written Opinion in International Application PCT/US2015/055417, dated Sep. 15, 2016, 9 pgs.
"Non Final Office Action Issued in U.S. Appl. No. 14/683,056", dated Sep. 21, 2018, 34 pages.
"Non Final Office Action Issued in U.S. Appl. No. 14/683,100", dated Sep. 27, 2018, 45 pages.
"Office Action Issued in European Patent Application No. 15785012.4", dated Oct. 26, 2018, 7 pages.

* cited by examiner

ANNOTATED GEOMETRY

CROSS REFERENCE TO RELATED APPLICATIONS

This application claims the benefit of U.S. Provisional Patent Application No. 62/063,741, titled "Data Visualization" filed Oct. 14, 2014.

BACKGROUND

Data visualization is a process for graphically representing data in a visualization, for example, a chart, an infographic, a map, a gauge, etc. Sharing visualizations between applications was often impossible or resulted in a disconnected experience due to missing functionality or inconsistent layouts. Developments teams had to write compatibility layers for applications to interface or support interaction in a reduced functionality mode (e.g. show bitmaps or nothing at all). It is with respect to these and other considerations that examples will be made.

SUMMARY

This summary is provided to introduce a selection of concepts in a simplified form that are further described below in the Detailed Description section. This summary is not intended to identify all features of the claimed subject matter, nor is it intended to limit the scope of the claimed subject matter.

Aspects of the present disclosure provide annotated geometry, which associates geometry with contextual information. Contextual information includes metadata about the geometry, which is used in aspects to improve the functioning of a device providing the visualization. Improved functioning of the device providing the visualization includes providing new features, and more efficient use of device resources for executing legacy features.

According to an aspect, associating contextual information with geometry is achieved via escapes built into the definition of geometries according to the series layout of a particular visualization. The escapes annotate data bindings for the geometries, indicate areas of interactivity, and suggest styling cues. According to aspects, the client is free to use or disregard the escapes when rendering the visualization. In this way, new features and resource saving shortcuts may be added to new versions of the system without disrupting backwards compatibility with older versions.

Examples may be implemented as a computer process, a computing system, or as an article of manufacture such as a computer program product or computer readable media. The computer program product may be a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of other aspects of the present disclosure.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the disclosure is defined by the appended claims. Examples may take the form of a hardware implementation, or an entirely software implementation, or an implementation combining software and hardware aspects. The following detailed description is, therefore, not to be taken in a limiting sense.

Examples of the present disclosure are directed to providing annotated geometry. The annotated geometries are provided within a data visualization platform (DVP) architecture, which enables building of a data visualization (e.g., a chart, an infographic, a map, a gauge, etc.) via a one-directional chain of separate stages, each stage having a simple input interface and output interface, and each object in a visualization is associated with geometry that can be annotated. Example annotations may be transmitted as 'non-printable' escape sequences along with the geometry, and may be defined by a {escape-type, escape-data} pair, which serves to provide metadata context in or around geometry (e.g., figures, segments, meshes, etc.). According to aspects, the annotations are structured such that they may be ignored by clients that do not support or otherwise do not care about annotations such that the presence of annotations does not affect how geometries are rendered. From this combination of geometry and annotations, clients are able to create interactive and dynamic user interfaces (UI) from arbitrary visualizations with reduced processing costs, thus improving the functionality of the devices on which the system runs.

In various aspects, annotations are provided that are sufficiently rich to allow clients to make sense of visualization layout on their own. For example, in a column chart series, clients need to be able to understand that each rectangle represents a specific data point and also that the value of the data point is reflected as the top edge of the rectangle (i.e., value is represented by height, visualized as the top edge).

Aspects of annotations enable several useful behaviors in visualizing data with reduced cost in memory compared to previous implementations. For example, by annotating a set of geometries with a data point index (e.g., a category index), a client can avoid the enormous memory churn and rendering overhead previously associated with figure-by-figure rendering (e.g., a "Vary by Color" feature) by managing nested formats, specified by the annotations, that the client applies as each data point is transmitted. In another example, memory cost is reduced by annotating a repeated geometry within a visualization as a one master geometry and instances thereof, which enables the client to take shortcuts, such as, for example, describing instances via a point within the visualization rather than full geometry. In yet another example, features of a visualization (e.g., geometry borders) that are defined during layout, rather than at rendering, can be changed by the client after layout via annotations, wherein the client reads the annotations to determine whether to toggle the feature when sending the visualization to the renderer.

Figure 1:
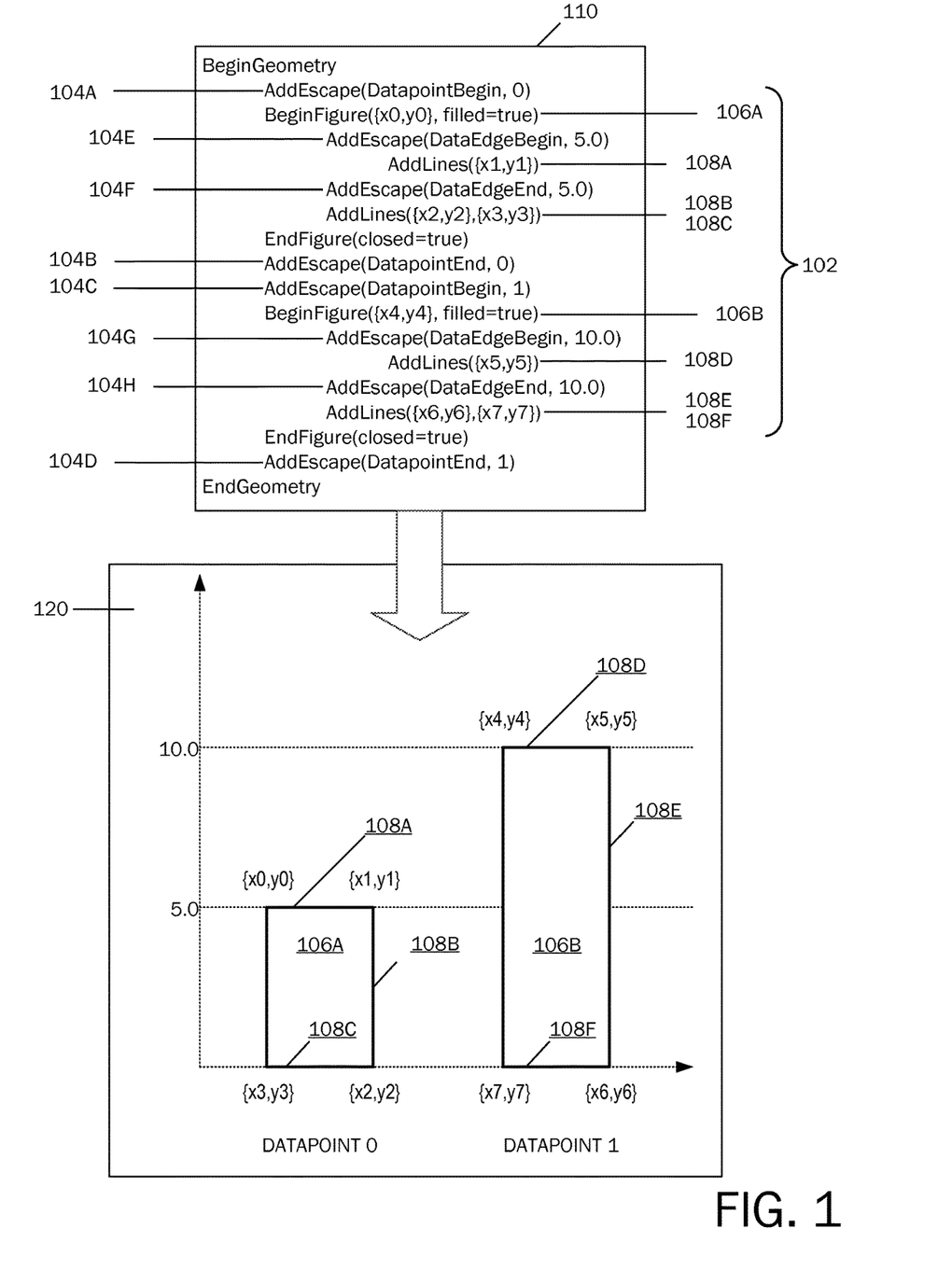
FIG. 1 illustrates an example annotated geometry and its rendering via an example visualization.

FIG. 1 illustrates an example annotated geometry 110 and its rendering via an example visualization 120. As shown, the annotated geometry 110 comprises a plurality of escapes 104A-H (collectively, escapes 104) associated with a plurality of figures 106A-B and primitives 108A-F (collectively, geometry 102) that are graphically presented via visualization 120.

Annotated geometry 110 is comprised of geometries 102 and contextual information, such as escapes 104. Geometries 102 are the graphical representation of data within a visualization 120 and are comprised of primitives 108 (e.g., lines or Beziers) and associated properties. In various examples, two-dimensional geometries 102 are plotted as a series of figures 106 (e.g., rectangles) or primitives 108 (e.g., lines or Beziers) which can be passed directly to an appropriate rendering Application Programming Interface (API). According to aspects, three-dimensional geometries 102 are plotted as meshes. It should be noted that only two types of primitives 108 are exposed: lines and Beziers. From these, any geometry 102 can be approximated. For example, a circle can be approximated by four Beziers (one per quadrant). This simplicity allows applications to pass the primitives 108 straight through to a rendering API without any additional processing, yet without sacrificing performance. In most rendering APIs, non-linear curves (e.g. circles, arcs) are internally decomposed into cubic Beziers, thus it is beneficial to describe geometry 102 at this level.

According to aspects, escapes 104 comprise a standard enumeration to identify a type, and can optionally comprise a data payload to provide further information (e.g., a pointer or a scalar value). The escapes 104 serve to provide metadata context in or around geometry 102 within a visualization 120. In various examples, an escape 104 may be embedded or presented inline as a standalone annotation in the geometry 102 to affect a discrete annotation. Alternatively, escapes 104 may also "bookend" geometry by having a first escape 104 begin a region affected by an annotated and a second escape 104 end the annotated region.

In various examples, the metadata carried by an escape 104 enables additional behaviors with respect to the geometry 102 with which the escape 104 is associated. For example, the escapes 104 within annotated geometry 110 are processed to indicate where corresponding data labels should be placed. The annotated geometry 110 are processed to identify escapes 104 appropriate for data label locations based on their standard enumerations, and then each data label is positioned near the associated geometry 102 within the visualization 120.

For example, as illustrated in FIG. 1, an escape 104A, having the enumeration "DatapointBegin," is used as to annotate the start of geometry 102 represented by first figure 106A. The escape 104B, having the enumeration "Datapoin-tEnd," is used to annotate the end of the portion of the geometry 102 representing first figure 106A. Similarly, the portion of the geometry 102 representing second FIG. 106B is annotated by escapes 104C and 104D.

Additional escapes 104 associated with individual primitives 108 are also enabled. For example, as illustrated in FIG. 1, escapes 104E and 104F, having the enumerations "DataEdgeBegin" and "DataEdgeEnd" respectively, are used to annotate the line running to {x1, y1} as an edge of the data for data point 0. Similarly for data point 1, escapes 104G and 104H annotate an edge of the data.

By annotating figures 106 or primitives 108 via escapes 104, additional behaviors are enabled with respect to the annotated figures 106 or primitives 108. In one example, an escape 104 is used to associate a data binding with a figure 106. As will be appreciated, the geometry 102 may include many primitives 108, some of which are necessary for the presentation of a data series according to a series layout, but not representative of the value of the data series. For example, a column in a column chart represents the value of the data series via height, but may also include width information. A data binding enables an aspect of the geometry 102 (e.g., one or more of the primitives 108) to be called out as being representative of the value of a data series or data point within the visualization 120. For example, a top edge of a rectangular column (e.g., primitive 108A) corresponds to the value for that data point, which sets the length of the sides of the column (e.g., primitive 108B). Accordingly, escapes 104 may be added to annotate the primitive 108 that calls the top edge (line) out as a data edge to bind the data series to the geometry 102. In an alternative example, if the sides of the column set the position of the top edge, escapes 104 may be added to annotate the side edges to bind the data series to the geometry 102.

In another example, an escape 104 is used to suggest areas of interactivity with a figure 106 within the geometry 102. For example, a data point may be selected and its data edge moved within the visualization 120 to change its value (i.e., graphical goal seek) in the data series. In another example, an area of interactivity may be selected to manipulate a property of the graphical representation unrelated to the value of the data series (e.g., adjust the width of a column, re-order wedges in a pie chart, adjust the extent that a figure 106 projects in a third dimension, etc.) According to aspects, an escape 104 is used to provide feedback (e.g., highlight the data point) that informs a user that the data point is an interactive data point that is selectable to invoke an interactivity.

According to another example, an escape 104 is used to suggest a styling cue for an aspect of a figure 106, in which the data series is processed to determine areas of interest in the visualization 120. According to aspects, areas of interest are automatically determined according to a series layout, and in other aspects are set by a user before layout of the visualization 120. For example, in a line chart, statistical trends, outliers, or patterns are automatically determined as areas of interest, whereas a portion of the line may set by a user as an area of interest (e.g., the portion of the yearly sales data chart corresponding to the sales data for March) or an area paramount to the meaning of the visualization 120. Accordingly, an escape 104 can be added to enable the primitives 108 for the interesting portion to be formatted differently than primitives 108 outside of the area of interest (e.g., thicker than the other line portions, presented in a different color, presented in 3D rather than 2D, etc.).

Figure 2:
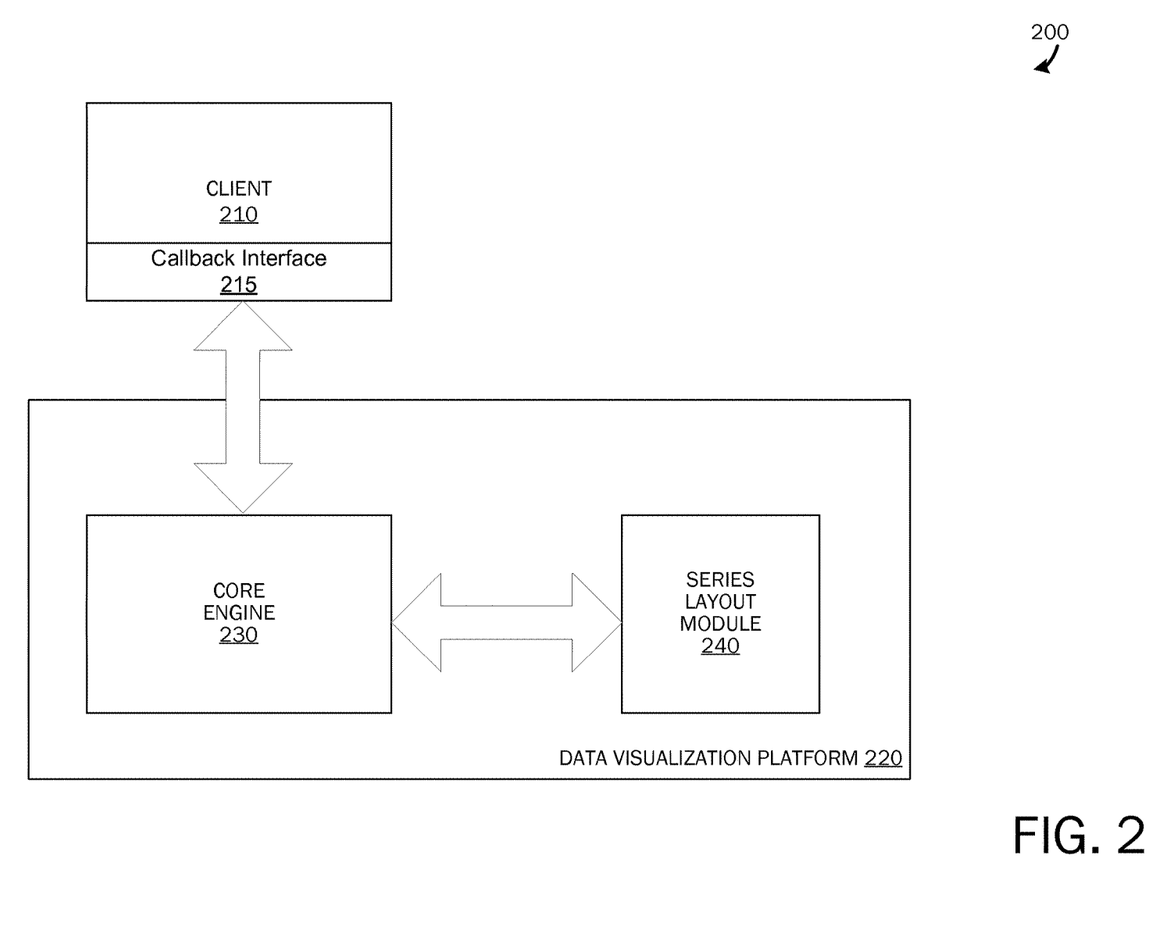
FIG. 2 is an example block diagram of an operating environment for providing annotated geometry.

FIG. 2 is an example block diagram of a system 200 for providing annotated geometry 110. When a client 210 begins rendering a visualization 120, the client 210 passes a request via a callback interface 215 to a data visualization platform 220 to have the geometry 102 for a given object in the visualization 120 transmitted to the client 210. According to aspects, the client 210 signals the data visualization platform 220 to begin layout for a given type of visualization 120 when the client 210 renders, hit tests, or performs other functions for which it needs to know the layout. The data visualization platform 220 positions objects within the visualization 120 and creates their geometries 102 via series layout module 240 during layout. In various examples, geometry 102 within a visualization 120 comprises a series of figures 106 (e.g., rectangles, circles, etc.) that are made of primitives 108 (e.g., lines or Beziers).

According to aspects, the series layout module 240 draws geometry 102 for each series of data within a plot area in a specific format (e.g., columns for column series, markers for scatter series, bubbles for bubble series, etc.). Escapes 104 may be created with the geometry 102 based on the series layout module's 240 process for creating geometry 102, such that escapes 104 are built into the geometry 102 to thereby automatically produce annotated geometry 110. According to aspects, the escapes 104 are integrated into strongly typed definitions of figures 106 within the series layout module 240, such that when a figure 106 is created for a visualization 120, the series layout module 240 includes pre-set escapes 104 associated with data bindings for the figures 106 according to the type of visualization 120 to be rendered. In various examples, the series layout module 240 is further operable to produce annotated geometry 110 from a limited and immutable view of the data and client context (e.g., visualization type, visualization size, client resolution/dpi, etc.). According to aspects, the annotated geometry 110 may then be cached in a series object, and the series layout module 240 is not invoked again unless layout is required again.

The core engine 230 is operable to deliver shared functionalities (e.g., titles, axes, legends, colors, etc.) of the series and data points based on the annotated geometry 110 without assistance from the series layout module 240. According to aspects, the escapes 104 are structured such that the client 210 is free to use or disregard the annotations when the visualization 120 is to be rendered.

In various examples, only the information necessary to produce the annotated geometry 110 (i.e., the limited and immutable view) is provided to the series layout module 240. In various aspects, the interfaces used by the layout module 240 are disconnected from the larger object model and therefore enforce strict isolation of the series layout module 240 from the rest of the system. Benefits of isolation include enabling the data visualization platform 220 to add new features that 'just work' with pre-existing visualization layouts, which reduces the cost of building or versioning series layouts provided by the series layout module 240.

According to aspects, the annotated geometry 110 is cached so that it can be iterated for animation or other interactivities without having to repeat layout. In various aspects, the cached information comprises a tree of element objects, where the root object is the visualization 120 (e.g., chart, infographic, map, gauge, etc.), and child elements include objects such as a legend, a plot area, chart elements (e.g., for data, series, or legend entries, a chart title, axis titles, etc.).

The client 210 is operable, in various aspects, to request drawing instructions from the data visualization platform 220. The client 210 provides a callback interface 215 via which the data visualization platform 220 transmit a normalized form of the objects and annotated geometry 110 to the client 210. That is, clients 210 do not have direct access to the internalized geometry, but instead are exposed to a normalized form streamed to them via a simple protocol, for example, via callback interface 215. According to an aspect, the client 210 renders each object's geometry 102 via a recursive walk of the visualization 120. Although a visualization 120 does not render itself, it can offer up per-object storage for formatting properties and effects such as colors, line patterns, etc. via an optional 'format' object which hangs off each object in the hierarchy, wherein the format object is a simple collection of predefined properties that the client 210, in various aspects, can set when building a visualization 120 and then later retrieve during rendering.

The client 210 is operable in aspects to process the annotations (e.g., escapes 104) to provide additional behaviors within the visualization with respect to the geometry 102 with which they are associated. For example, after a series layout module 240 has built geometry 102 for each data point, the core engine 230 processes the annotated geometry 110 to understand where corresponding data labels should be placed. To do this, the core engine 230 looks for appropriate escapes 104 based on the standard enumeration, and then positions each data label near the associated geometry 102 within the visualization 120, and configures text from the associated data point. According to aspects, the core engine 230 is operable to build shared objects (e.g., axes, labels, legends, etc.) and perform centralized shared functionalities (e.g., applying a visual theme, applying colorization to a data series, the creation of axes, titling, labeling, etc.) without participation from the series layout module 240.

The escapes 104 provide contextual information that the client 210 is operable to use in several visualization and layout types to provide different behaviors based on the type. The reuse of the same escape 104 with different geometry 102 provides a common toolset to perform layout-specific behaviors. For example, an escape 104 designating a primitive 108 as an interactive element that enables a user to select the primitive 108 to lengthen or shorten the bar via a dragging input in the visualization, also enables a user to select a primitive 108 in a pie chart layout to rotate an edge of a wedge in the visualization to take up a larger/smaller percentage of the pie chart.

According to an aspect, the client 210 is also operable to ignore the escapes 104 associated with the geometry 102. By ignoring escapes 104, the client 210 is operable to retain backwards compatibility without reducing functionality or relying on a versioning transform. Escapes 104 that provide unsupported functionalities (i.e., unrecognized escapes), such as, for example, functionalities added in a new version, are ignored in various aspects by the previous versions of the client 210 but remain associated with the data so that a different (newer) clients 210, which do support the functionalities, can still use the escapes 104. In this way, series layout module 240 can include any number of escapes 104, which can be later used to bind portions of the geometry 102 to the data it represents in the visualization 120. According to aspects, data bound to the geometry 102 is used to improve how the client 210 renders the visualization (e.g., via geometry instancing, rendering data, styling overrides, styling cues, etc.), and to improve user interactivity with all or a portion of a geometry 102 (e.g., enabling a user to manipulate a data edge within a visualization 120 to affect the underlying data, etc.).

TABLE 1 gives examples of escapes 104 and their functionalities. As will be understood, TABLE 1 provides a non-exhaustive list of escapes 104; other escapes 104 are possible and those shown in TABLE 1 provided as illustrative examples.

TABLE 1

Example Escapes

| Enumeration | Payload | Comment |
|---|---|---|
| //Geometry Instancing | | |
| MasterBegin | <none> | indicates the beginning of a master geometry |
| MasterEnd | <none> | indicates the end of a master geometry |
| Instance2D | Point2D* | indicates where the center should be positioned of an instance of a master geometry |
| //Series/Datapoint Callouts | | |
| DatapointBegin | uint32_t | data index, beings scope geometry representing a datapoint |
| DatapointEnd | uint32_t | data index, ends scope geometry representing a datapoint |
| DatapointPoint | IndexedPoint2D* | indicates the position of a datapoint when there is no geometry |
| DatapointChildrenBegin | uint32_t | parent data index, begins scope geometries representing children of a datapoint |
| DatapointChildrenEnd | uint32_t | parent data index, ends scope geometries representing children of a datapoint |
| DataEdgeBegin | uint32_t | data index, begins scope geometry representing the data value (e.g., the line at the end of a bar in a bar chart) |
| DataEdgeEnd | uint32_t | data index, ends scope geometry representing the data value (e.g., the line at the end of a bar in a bar chart) |
| AggregateBegin | uint32_t | aggregate ID, begins scope aggregate geometry representing multiple datapoints |
| AggregateEnd | uint32_t | aggregate ID, ends scope aggregate geometry representing multiple datapoints |
| //Rendering data | | |
| StringRenderingData | StringRenderingData* | string rendering data that can be used to format the geometry |
| DiscreteRenderingData | NumericRenderingData* | discrete rendering data that can be used to format the geometry |
| //Styling Overrides | | // These overrides are applied on top of any other styling. |
| ResetStyleOverrides | GeometryEscape | style override to be reset. A value of 0 will reset all styles. |
| LineColorOverride | Color* | overriding color |
| LineThicknessScaling | Float* | multiplier representing a scaling change to the base line thickness. 1.0 represents no change, 2.0 is double the thickness, etc. |
| LineDashStyleOverride | LineDashStyle | overriding LineDashStyle |

Figure 3:
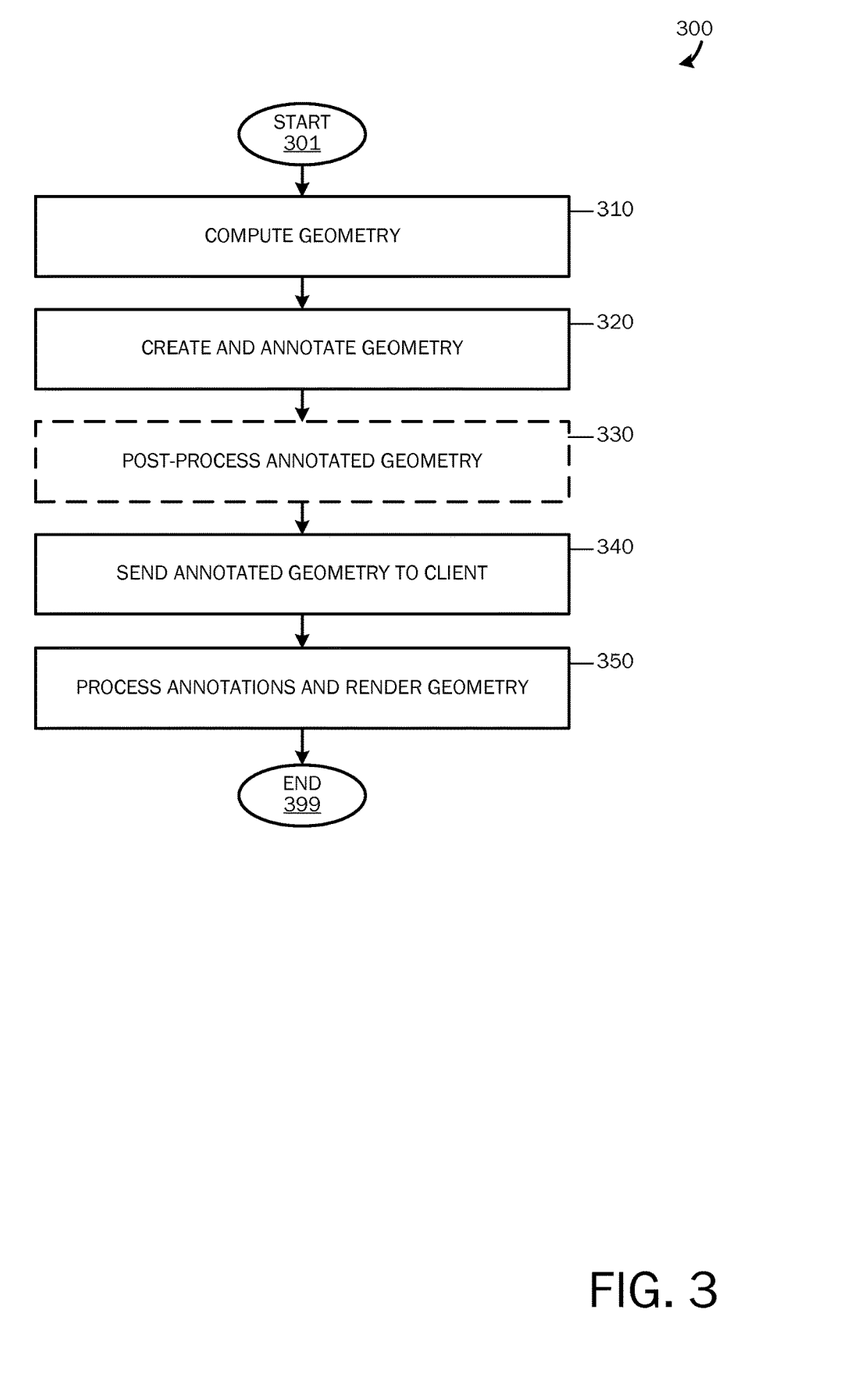
FIG. 3 is an example flow chart of a method for associating geometry vectors with contextual information.

FIG. 3 is an example flow chart showing general stages involved in a method 300 for associating geometry vectors with contextual information (e.g., annotations). Method 300 begins at START 301 and proceeds to OPERATION 310, where the series layout module 240 computes the geometry 102 for a visualization 120 comprising figures 106 and primitives 108.

The method 300 proceeds to OPERATION 320, where the series layout module 240 creates and annotates geometry, for example, to associate data bindings with figures 106, suggest areas of interactivity with figures 106, to suggest styling cues with primitives 108, etc. In various examples, escapes 104 that annotate the geometry 102 are created with the geometry 102 to automatically produce annotated geometry 110. In various aspects, the escapes 104 are non-printable sequences that a client 210 can disregard without affecting the ability to render the geometry 102.

At OPTIONAL OPERATION 330, the core engine 230 performs a post-process of the annotated geometry 110. According to aspects, post processing the annotated geometry 110 allows for additional shared functionalities or shared escapes to be added to the annotated geometry 110. Several layers of post-processing may occur to build upon the annotated geometry 110. For example, the core engine 230 is operable to take the output of the series layout module 240 and add in more capabilities (e.g., data markers, reference lines, tool tips, etc.) according to the meta-information in the annotating escapes 104. In this way, a series layout module 240 may be continually used as new versions with additional functionalities are built; new annotations are added in post-processing on top of older annotations.

The method 300 then proceeds to OPERATION 340, where the annotated geometry 110 is sent to the client 210 via the callback interface 215. At OPERATION 350, the annotations (e.g., escapes 104) are processed and the geometry 102 is rendered. The processed annotations are operable to provide additional functionality to the geometry 102 in a visualization and reduce system resources needed to identify particular aspects of the geometry 102 to apply special formatting or implement additional functionalities. The method 300 concludes at END 399.

While the present disclosure has been described in the general context of program modules that execute in conjunction with an application program that runs on an operating system on a computer, those skilled in the art will recognize that the disclosure may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
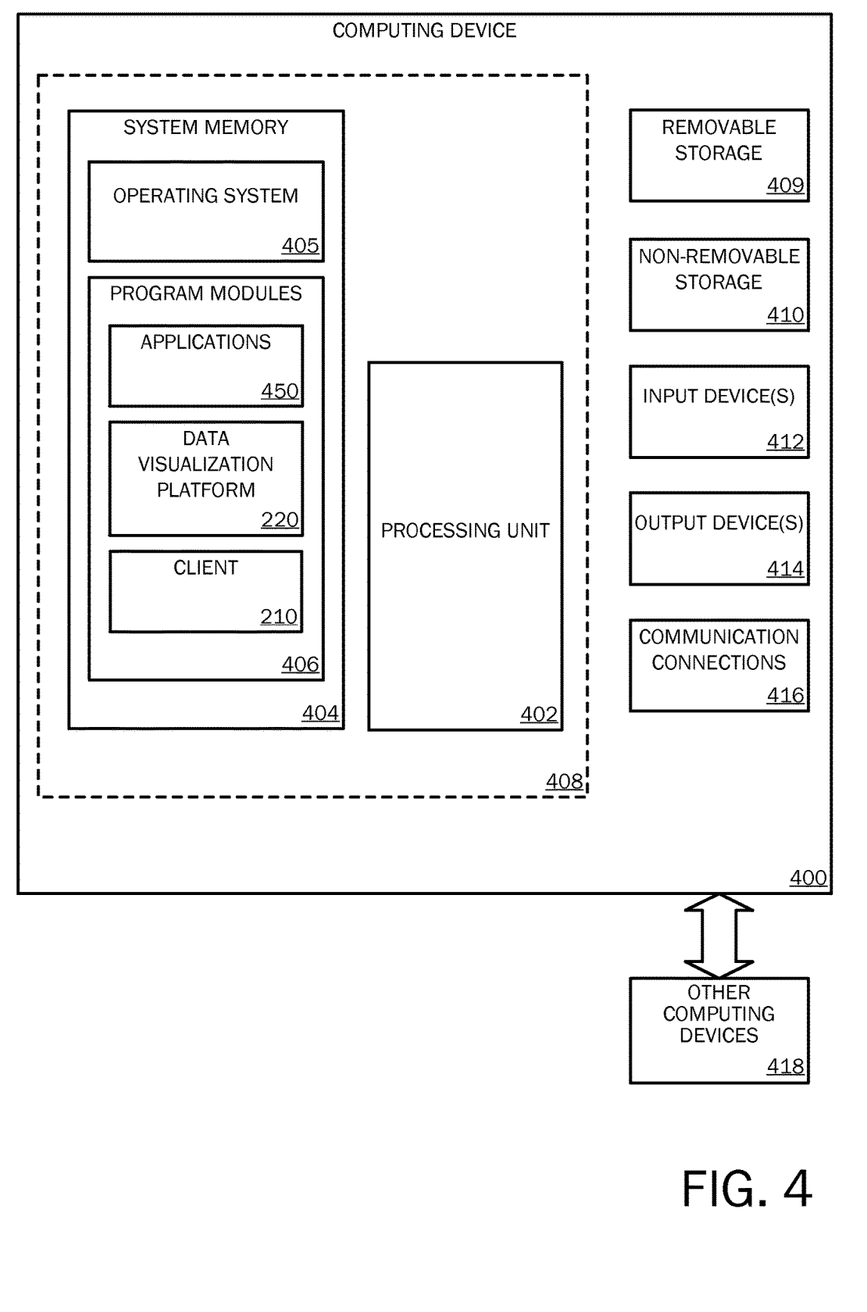
FIG. 4 is an example block diagram illustrating example physical components of a computing device.
Figure 5A:
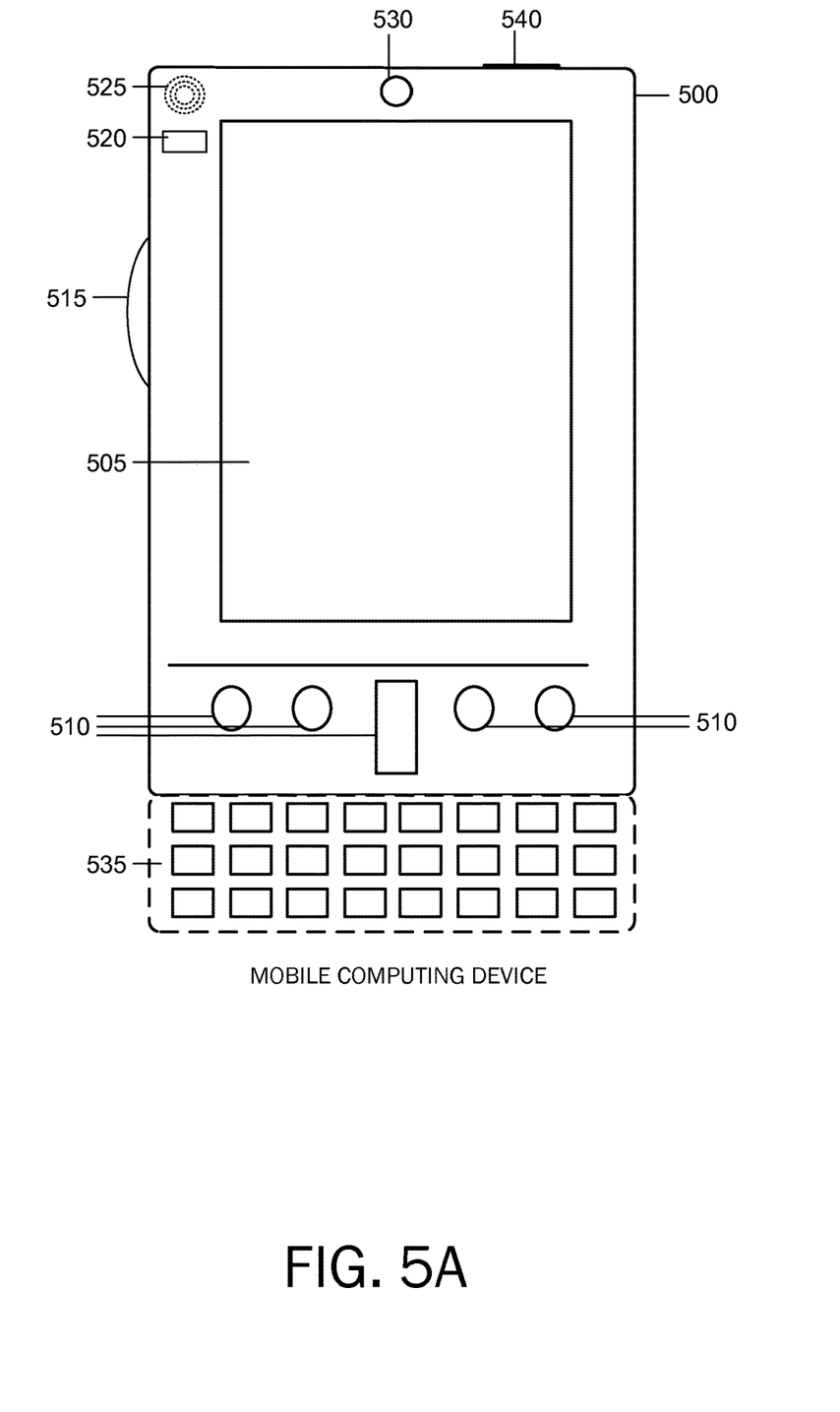
FIGS. 5A and 5B are example block diagrams of a mobile computing device.
Figure 5B:
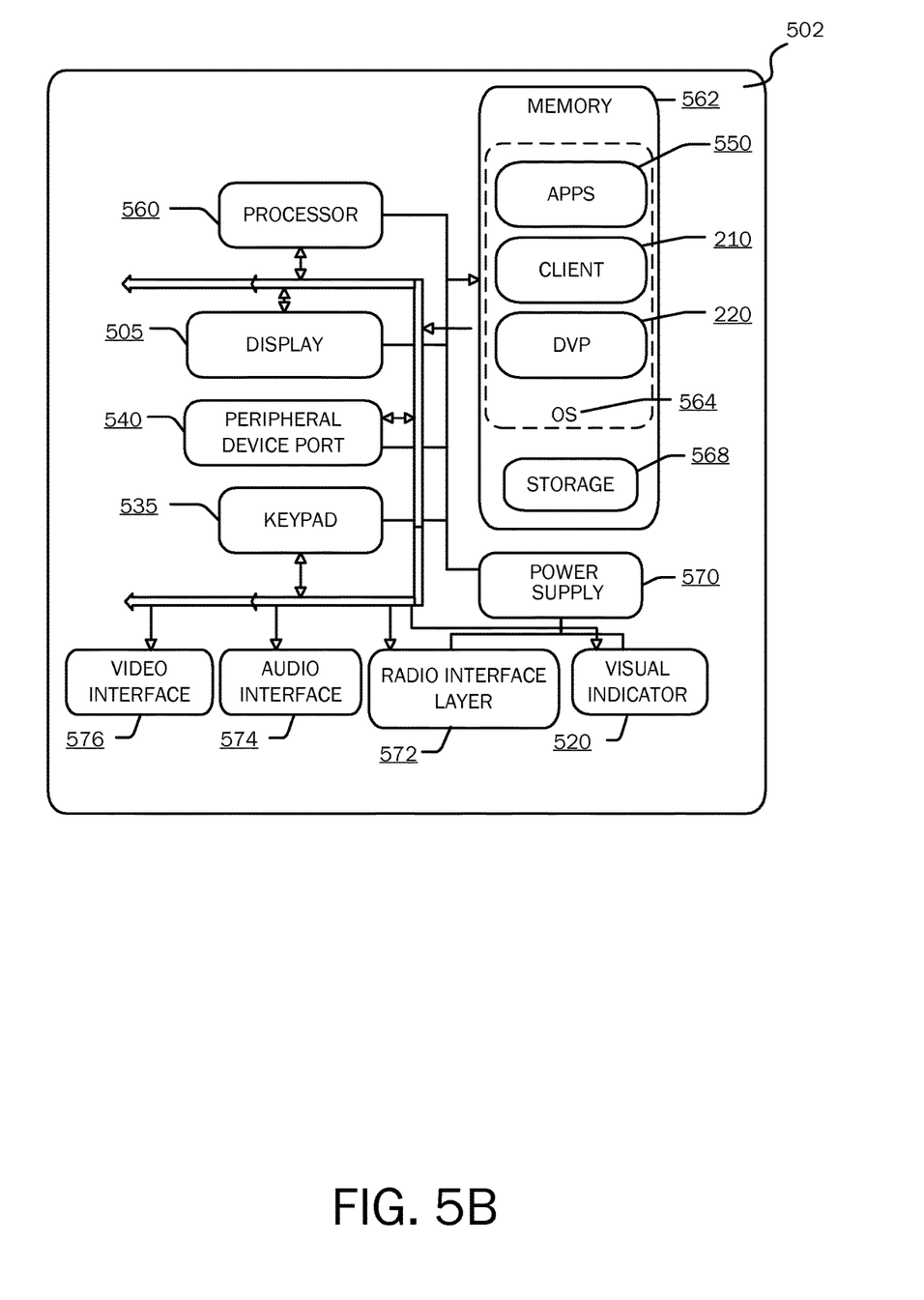
Figure 6:
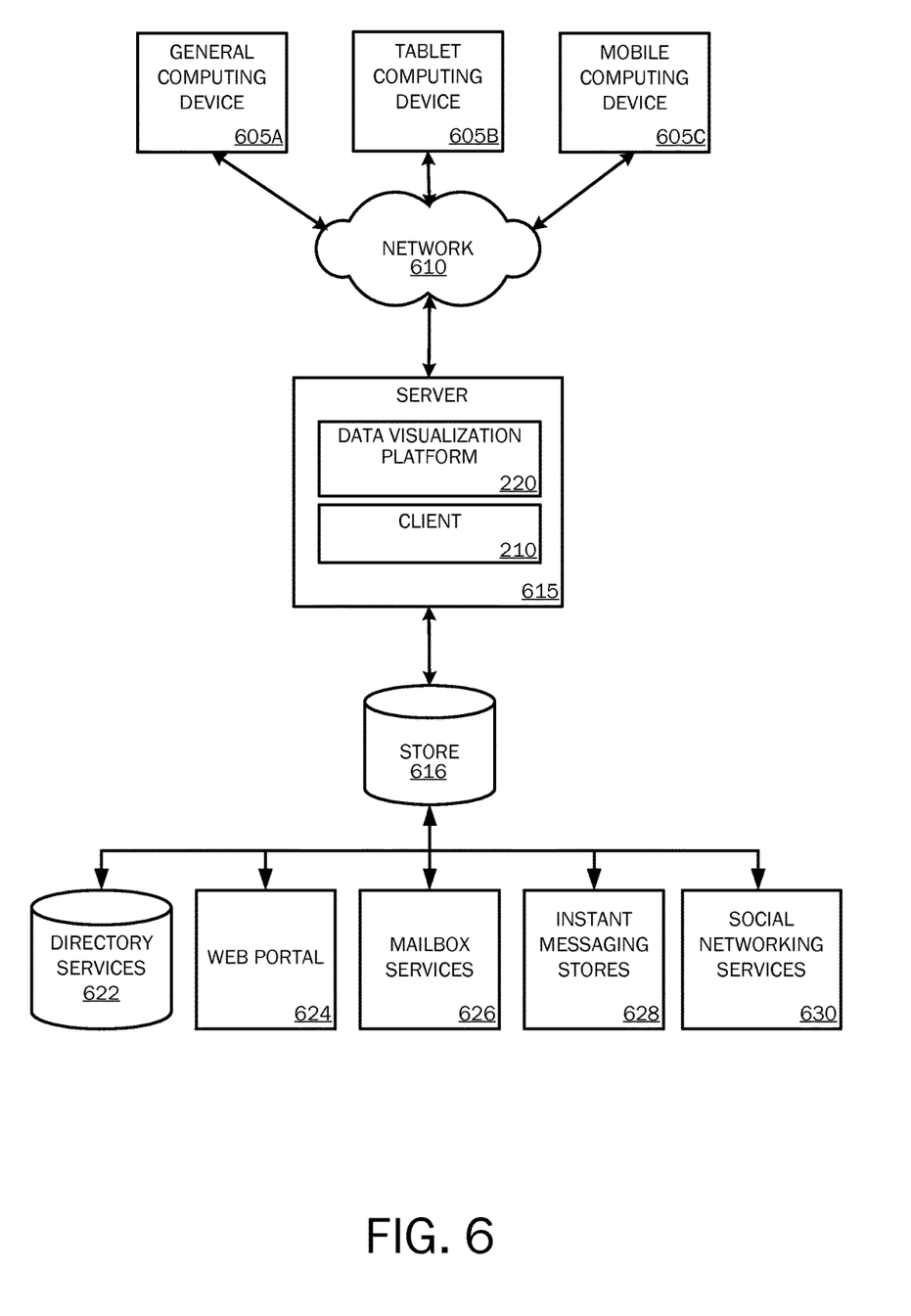
FIG. 6 is an example block diagram of a distributed computing system.

FIGS. 4-6 and the associated descriptions provide a discussion of a variety of operating environments in which examples of the disclosure may be practiced. However, the devices and systems illustrated and discussed with respect to FIGS. 4-6 are for purposes of example and illustration and are not limiting of a vast number of computing device configurations that may be utilized for practicing aspects of the disclosure, described herein.

FIG. 4 is a block diagram illustrating physical components (i.e., hardware) of a computing device 400 with which examples of the present disclosure may be practiced. The computing device components described below may be suitable for the client device described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more programming modules 406 suitable for running software applications 450, such as client 210. According to an aspect, the system memory 404 may include the data visualization platform 220. The operating system 405, for example, may be suitable for controlling the operation of the computing device 400. Furthermore, aspects of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., client 210, data visualization platform 220) may perform processes including, but not limited to, one or more of the stages of the method 300 illustrated in FIG. 3. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, or transceiver circuitry; universal serial bus (USB), parallel, or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects of the disclosure may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative examples, mobile computing device 500 may incorporate more or less input elements. For example, the display 505 may not be a touch screen in some examples. In alternative examples, the mobile computing device 500 is a portable phone system, such as a cellular phone. The mobile computing device 500 may also include an optional keypad 535. Optional keypad 535 may be a physical keypad or a "soft" keypad generated on the touch screen display. In various aspects, the output elements include the display 505 for showing a graphical user interface (GUI), a visual indicator 520 (e.g., a light emitting diode), or an audio transducer 525 (e.g., a speaker). In some examples, the mobile computing device 500 incorporates a vibration transducer for providing the user with tactile feedback. In yet another example, the mobile computing device 500 incorporates peripheral device ports 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 can incorporate a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

One or more application programs 550, for example, client 210, may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the data visualization platform 220 may be loaded into memory 562. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications or an audio interface 574 may be used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one example of the architecture of a system for providing data visualization as described above. Content developed, interacted with, or edited in association with the client 210 or data visualization platform 220 may be stored in different communication channels or other storage types. For example, various documents may be stored using a directory service 622, a web portal 624, a mailbox service 626, an instant messaging store 628, or a social networking site 630. The client 210 or data visualization platform 220 may use any of these types of systems or the like for providing data visualization, as described herein. A server 615 may provide the client 210 or data visualization platform 220 to clients 605A-C. As one example, the server 615 may be a web server providing the client 210 or data visualization platform 220 over the web. The server 615 may provide the client 210 or data visualization platform 220 over the web to clients 605 through a network 610. By way of example, the client computing device may be implemented and embodied in a personal computer 605A, a tablet computing device 605B or a mobile computing device 605C (e.g., a smart phone), or other computing device. Any of these examples of the client computing device may obtain content from the store 616.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope of the disclosure as claimed in any way. The aspects, examples, and details provided in this application are considered sufficient to convey possession and enable others to make and use the best mode of present disclosure. The present disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

I claim:

1. A method for improving computer functionality when providing a visualization of data by associating geometry with contextual information, comprising:
receiving data comprising a data series;
computing geometry to graphically represent the data series in the visualization based on a selected layout;
annotating the geometry with a plurality of escapes to produce annotated geometry, wherein each escape comprises an annotation that provides metadata context to add functionality to the geometry in the visualization, wherein the functionality provided by the plurality of escapes is based on a layout type of the visualization;
associating the annotated geometry with the data series; and
transmitting the annotated geometry to a client for processing to render and display the visualization, wherein at least one escape in the annotated geometry can be ignored by the client.

2. The method of claim 1, wherein the plurality of escapes comprise non-printable sequences integrated into the geometry.

3. The method of claim 1, wherein the client ignores at least one escape when processing the annotated geometry to render the visualization when the at least one escape provides an unsupported functionality.

4. The method of claim 1, wherein the plurality of escapes are integrated into a figure definition, such that when computing the geometry to graphically represent the data series in the visualization, the geometry is automatically associated with the data series via the figure definition.

5. The method of claim 1, wherein annotating the geometry with the plurality of escapes comprises annotating the geometry with at least one escape in the plurality of escapes to provide a data binding between the data series and the annotated geometry, wherein the data binding calls out an element of the annotated geometry as representative of a value of the data series within the visualization.

6. The method of claim 1, wherein annotating the geometry with the plurality of escapes comprises annotating the geometry with at least one escape in the plurality of escapes to provide one or more areas of interactivity within the visualization.

7. The method of claim 1, further comprising:
processing the data series to determine an area of interest within the data series, wherein the area of interest includes at least one of:
a statistical trend;
an outlier; or
a pattern;
associating, using one or more escapes in the plurality of escapes, the area of interest with a portion of the annotated geometry; and
associating, using one or more escapes in the plurality of escapes, one or more styling cues with the area of interest to cause the area of interest to be formatted differently in the visualization.

8. The method of claim 1, further comprising:
setting a user defined portion of the data series as an area of interest; and
associating, using at least one escape in the plurality of escapes, an area of interest with a portion of the annotated geometry to provide styling cues.

9. The method of claim 1, wherein associating the annotated geometry with the data series enables the client to process contextual information to provide a first behavior according to a first layout type and to provide a second behavior according to a second layout type.

10. A system for improving computer functionality when providing a visualization of data by associating geometry with contextual information, comprising:
a processor; and
a memory storage including instructions which, when executed by the processor, are operable to:
receive data comprising a data series from a client to plot in a visualization;
compute one or more figures to graphically represent the data series in the visualization;
associate contextual information with at least one figure;
provide one or more shared objects;
associate contextual information with at least one first shared object;
produce annotated geometry to represent the one or more shared objects and the one or more figures, wherein the annotated geometry includes one or more escapes that each comprise an annotation that associates the contextual information with the at least one shared object and the at least one figure to add functionality to the geometry; and
transmit the annotated geometry to the client for processing to render and display the visualization, wherein at least one escape in the annotated geometry can be ignored by the client.

11. The system of claim 10, wherein the one or more shared objects includes at least one of:
an axis:
a title: or
a legend.

12. The system of claim 10, further comprising instructions for reading the contextual information associated with the one or more figures to determine where to position a respective shared object in the visualization when producing the annotated geometry.

13. The system of claim 10, further comprising instructions for applying one or more shared functionalities on at least one figure or at least one shared object, wherein applying the one or more shared functionalities includes at least one of:
applying a colorization to the figure representing the data series;
applying a visual theme;
inserting trend lines; or
labeling data points.

14. The system of claim 10, further comprising instructions for performing post processing to associate one or more shared escapes with at least one figure.

15. The system of claim 10, further comprising instructions for:
processing the data to determine an area of interest within the data;
associating the area of interest with a portion of the annotated geometry using at least one escape in the one or more escapes; and
associating one or more styling cues with the area of interest using at least one escape in the one or more escapes, wherein the area of interest includes at least one of:
a statistical trend;
an outlier;
a pattern; or
a user defined portion of the data.

16. The system of claim 10, further comprising instructions for setting a data binding between an element of a figure in the one or more figures and the data series using at least one escape in the one or more escapes, wherein the data binding calls out the element as representative of a value of the data series within the visualization.

17. The system of claim 10, further comprising instructions for suggesting areas of interactivity within the visualization via associating the contextual information with at least one figure.

18. A computing device, comprising:
at least one processor; and
a memory storing instructions that, when executed by the at least one processor, are operable to:
receive annotated geometry that is associated with a data series, the annotated geometry comprising geometry that represents the data series in a visualization and one or more escapes associated with the geometry, each escape comprising an annotation that provides additional functionality to the geometry;
processing the annotated geometry;
based on the processing, determining at least one escape in the annotated geometry provides an unsupported functionality;
based on the determination, ignoring the at least one escape when rendering the visualization; and
displaying the rendered visualization.

19. The computing device of claim 18, wherein the additional functionality comprises at least one of:
providing one or more data label locations;
providing an indication of an area of interactivity; or
providing a styling cue.

20. The computing device of claim 18, wherein the additional functionality provided by the one or more escapes is based on a layout type of the visualization.

* * * * *